United States Patent
Shim et al.

(10) Patent No.: US 10,838,527 B2
(45) Date of Patent: Nov. 17, 2020

(54) TOUCH SENSOR AND DISPLAY DEVICE INCLUDING THE SAME

(71) Applicant: Samsung Display Co., Ltd., Yongin-si (KR)

(72) Inventors: Jin Bo Shim, Yongin-si (KR); Jung-Moo Hong, Seoul (KR); In Seo Kee, Asan-si (KR); Kyung Seop Kim, Hwaseong-si (KR); Hyun Jae Na, Seoul (KR); Sang Youn Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/960,122

(22) Filed: Apr. 23, 2018

(65) Prior Publication Data

US 2019/0087027 A1    Mar. 21, 2019

(30) Foreign Application Priority Data

Sep. 15, 2017   (KR) ...................... 10-2017-0118966

(51) Int. Cl.
   *G06F 3/041* (2006.01)
   *G06F 3/044* (2006.01)

(52) U.S. Cl.
   CPC ............. *G06F 3/041* (2013.01); *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
   CPC ........ G06F 3/041; G06F 3/044; G06F 3/0412; G06F 2203/04103; G06F 3/04111; G06F 3/04112
   See application file for complete search history.

(56) References Cited

U.S. PATENT DOCUMENTS

| 8,988,086 B1 * | 3/2015 | Peterson ................. G06F 3/044 324/679 |
| 9,465,502 B2 | 10/2016 | Hotelling et al. |
| 2013/0307793 A1 * | 11/2013 | Song ...................... G06F 3/044 345/173 |
| 2015/0028894 A1 * | 1/2015 | Sleeman ................. G06F 3/044 324/662 |
| 2015/0060256 A1 * | 3/2015 | Kim ........................ G06F 3/044 200/600 |
| 2018/0095582 A1 * | 4/2018 | Hwang ................. G06F 3/0416 |

FOREIGN PATENT DOCUMENTS

| JP | 5390018 B2 * | 1/2014 | ............. G06F 3/044 |
| KR | 10-2015-0045676 A | 4/2015 | |
| KR | 10-1582887 B1 | 1/2016 | |
| KR | 10-2016-0068013 A | 6/2016 | |

* cited by examiner

*Primary Examiner* — Mark Edwards
(74) *Attorney, Agent, or Firm* — Lewis Roca Rothgerber Christie LLP

(57) ABSTRACT

A touch sensor includes: an active area including a first sub-active area and a second sub-active area; a plurality of first touch electrodes in the first sub-active area and the second sub-active area; and a plurality of second touch electrodes in the first sub-active area and the second sub-active area, and a length of a first border portion that is a separated area between adjacent first and second touch electrodes in the first sub-active area is different from a length of a second border portion that is a separated area between adjacent first and second touch electrodes in the second sub-active area.

20 Claims, 13 Drawing Sheets

TOUCH SENSOR AND DISPLAY DEVICE INCLUDING THE SAME

CROSS-REFERENCE TO RELATED APPLICATION

This application claims priority to and the benefit of Korean Patent Application No. 10-2017-0118966, filed on Sep. 15, 2017 in the Korean Intellectual Property Office, the entire content of which is incorporated herein by reference.

BACKGROUND

1. Field

Aspects of embodiments of the present invention relate to a touch sensor and a display device including the same.

2. Description of the Related Art

Recently, a touch panel has been disposed on a front of a display panel, such that a display device with a touch detecting function is in general use. A capacitance type, which is one of methods for realizing the touch panel, represents a method for detecting a touch position by sensing a change of capacitance formed between an electrode and a conductive object, such as a finger, depending on touching by a user. Regarding the capacitance-type touch sensor, a touch controller may sense the change of capacitance by receiving a touch sensing signal from a plurality of touch electrodes.

A touch sensing signal received from a touch electrode disposed to be distant from the touch controller may be further deteriorated by its resistance than a touch sensing signal received from a touch electrode disposed to be close to the touch controller. That is, uniformity of the touch sensing signal to the touch controller may be deteriorated by its resistance, such that touch sensing performance of the touch controller may be deteriorated. Particularly, this problem may become worse as the touch sensor becomes larger.

The above information disclosed in this Background section is only for enhancement of understanding of the background of the invention and, therefore, it may contain information that does not form the prior art that is already known in this country to a person of ordinary skill in the art.

SUMMARY

According to aspects of embodiments of the present invention, a touch sensor has improved uniformity of a touch sensing signal and improved touch sensing performance, and a display device including the same is provided. According to aspects of embodiments of the present invention, a capacitance-type touch sensor and a display device including the same are provided.

According to one or more exemplary embodiments of the present invention, a touch sensor includes: an active area including a first sub-active area and a second sub-active area; a plurality of first touch electrodes in the first sub-active area and the second sub-active area; and a plurality of second touch electrodes in the first sub-active area and the second sub-active area, wherein a length of a first border portion that is a separated area between adjacent first and second touch electrodes in the first sub-active area is different from a length of a second border portion that is a separated area between adjacent first and second touch electrodes in the second sub-active area.

At least one of the first touch electrodes may include at least one first protrusion, and at least one of the second touch electrodes may include at least one second protrusion arranged to interlock with the at least one first protrusion.

A number of the at least one first protrusion of the first touch electrode in the second sub-active area may be greater than a number of the at least one first protrusion of the first touch electrode in the first sub-active area.

A number of the at least one second protrusion of the second touch electrode in the second sub-active area may be greater than a number of the at least one second protrusion of the second touch electrode in the first sub-active area.

The touch sensor may further include a pad portion electrically connected to the first touch electrodes and the second touch electrodes, wherein the first sub-active area is nearer to the pad portion than the second sub-active area is, and the second border portion is longer than the first border portion.

The first sub-active area may be disposed in a center between respective edges of the active area, the second sub-active area may be disposed on respective sides of the first sub-active area, and the second border portion may be longer than the first border portion.

The first sub-active area may be disposed in a center of the active area, the second sub-active area may be disposed on a side area surrounding the first sub-active area, and the second border portion may be longer than the first border portion.

The at least one first protrusion of the first touch electrode in the second sub-active area may be larger than the at least one first protrusion of the first touch electrode in the first sub-active area.

The at least one second protrusion of the second touch electrode in the second sub-active area may be larger than the at least one second protrusion of the second touch electrode in the first sub-active area.

The touch sensor may further include a pad portion electrically connected to the first touch electrodes and the second touch electrodes, wherein the first sub-active area may be nearer to the pad portion than the second sub-active area is, and the second border portion may be longer than the first border portion.

The first sub-active area may be disposed in a center between respective edges of the active area, the second sub-active area may be disposed on respective sides of the first sub-active area, and the second border portion may be longer than the first border portion.

The first sub-active area may be disposed in a center of the active area, the second sub-active area may be disposed on a side area surrounding the first sub-active area, and the second border portion may be longer than the first border portion.

According to one or more exemplary embodiments of the present invention, a display device includes: a substrate; a transistor on the substrate; a light-emitting device on the transistor; an encapsulation layer on the light-emitting device; and a plurality of first touch electrodes and a plurality of second touch electrodes on the encapsulation layer, wherein the first touch electrodes and the second touch electrodes are in an active area to detect a touch position, the active area includes a first sub-active area and a second sub-active area, and a length of a first border portion that is a separated area between adjacent first and second touch electrodes in the first sub-active area is different from a length of a second border portion that is a separated area between first and second touch electrodes in the second sub-active area.

At least one of the first touch electrodes may include at least one first protrusion, at least one of the second touch electrodes may include at least one second protrusion arranged to interlock with the at least one first protrusion, and the length of the first border portion and the length of the second border portion may be determined by a number of the at least one first protrusion and a number of the at least one second protrusion.

A number of the at least one first protrusion of the first touch electrode in the second sub-active area may be greater than a number of the at least one first protrusion of the first touch electrode in the first sub-active area, and a number of the at least one second protrusion of the second touch electrode in the second sub-active area may be greater than a number of the at least one second protrusion of the second touch electrode in the first sub-active area.

The display device may further include a pad portion electrically connected to the first touch electrodes and the second touch electrodes, wherein the first sub-active area may be nearer to the pad portion than the second sub-active area is, and the second border portion may be longer than the first border portion.

The first sub-active area may be disposed in a center between respective edges of the active area, the second sub-active area may be disposed on respective sides of the first sub-active area, and the second border portion may be longer than the first border portion.

The first sub-active area may be disposed in a center of the active area, the second sub-active area may be disposed on a side area surrounding the first sub-active area, and the second border portion may be longer than the first border portion.

At least one of the first touch electrodes may include at least one first protrusion, at least one of the second touch electrodes may include at least one second protrusion arranged to interlock with the at least one first protrusion, and the length of the first border portion and the length of the second border portion may be determined by a size of the at least one first protrusion and a size of the at least one second protrusion.

The at least one first protrusion of the first touch electrode in the second sub-active area may be larger than the at least one first protrusion of the first touch electrode in the first sub-active area, and the at least one second protrusion of the second touch electrode in the second sub-active area may be larger than the at least one second protrusion of the second touch electrode in the first sub-active area.

According to an aspect of embodiments of the present invention, the uniformity of the touch sensing signal of the touch sensor may be improved, such that the touch sensing performance of the touch sensor may be improved.

DETAILED DESCRIPTION

Figure 1:
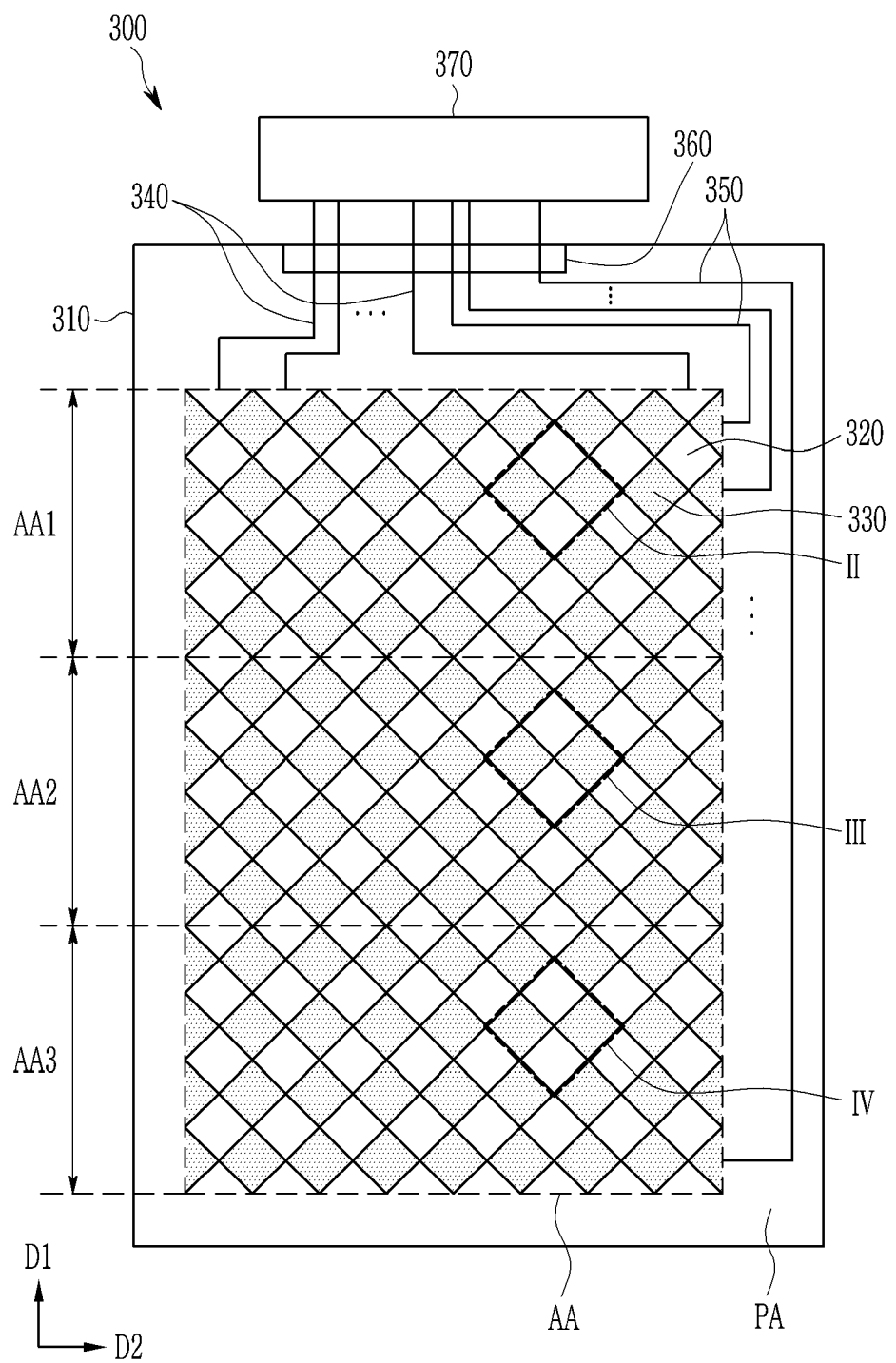
FIG. 1 shows a touch sensor according to an exemplary embodiment of the present invention.

Aspects of the present invention will be described more fully herein with reference to the accompanying drawings, in which some exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

The size and thickness of each configuration shown in the drawings may be arbitrarily shown for better understanding and ease of description, and the present invention is not limited thereto. In the drawings, the thicknesses of layers, films, panels, areas, etc., may be exaggerated for clarity. For better understanding and ease of description, the thicknesses of some layers and areas may be exaggerated.

It is to be understood that when an element, such as a layer, film, area, or substrate is referred to as being "on" another element, it can be directly on the other element or one or more intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The word "overlap" signifies overlapping from top to bottom in a cross-sectional view, or it means that all portions or some of them are disposed in a same area on a plane.

A touch sensor according to an exemplary embodiment of the present invention will now be described with reference to FIG. 1 to FIG. 4.

Figure 2:
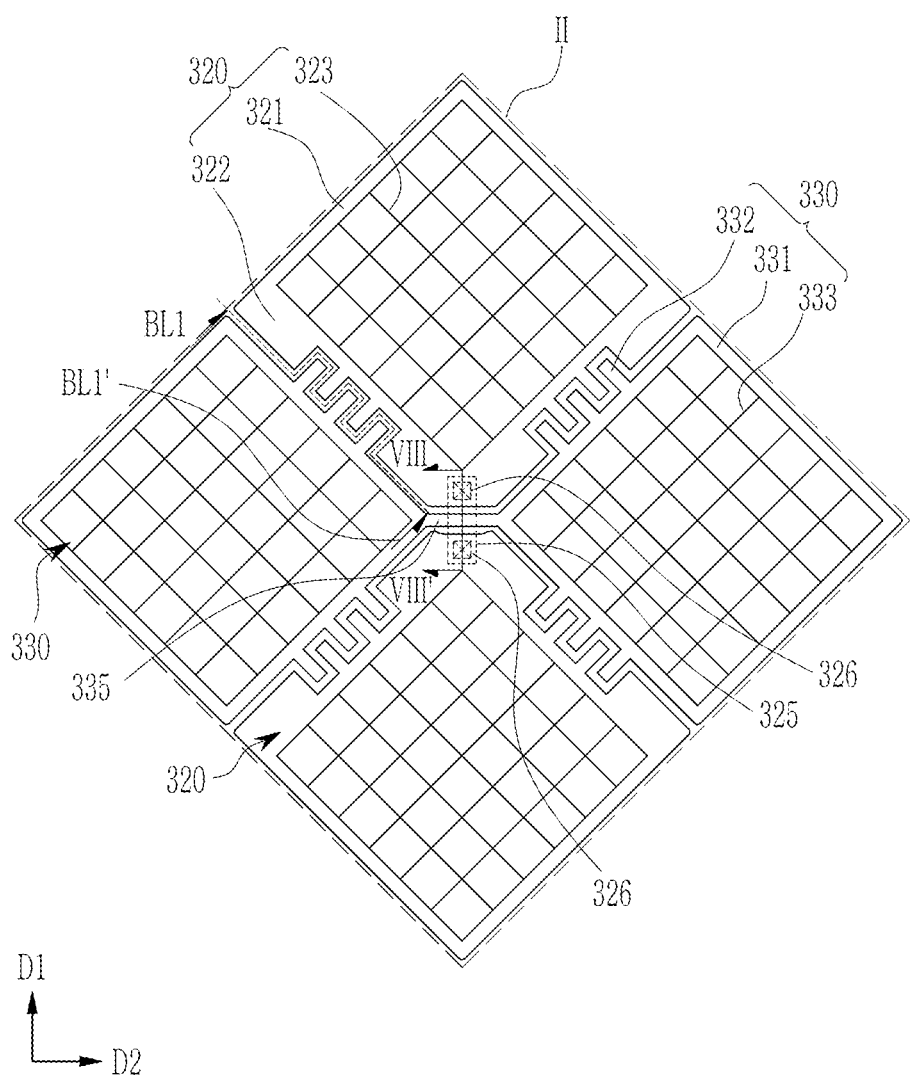
FIG. 2 shows an area II of FIG. 1 in further detail, according to an exemplary embodiment of the present invention.
Figure 3:
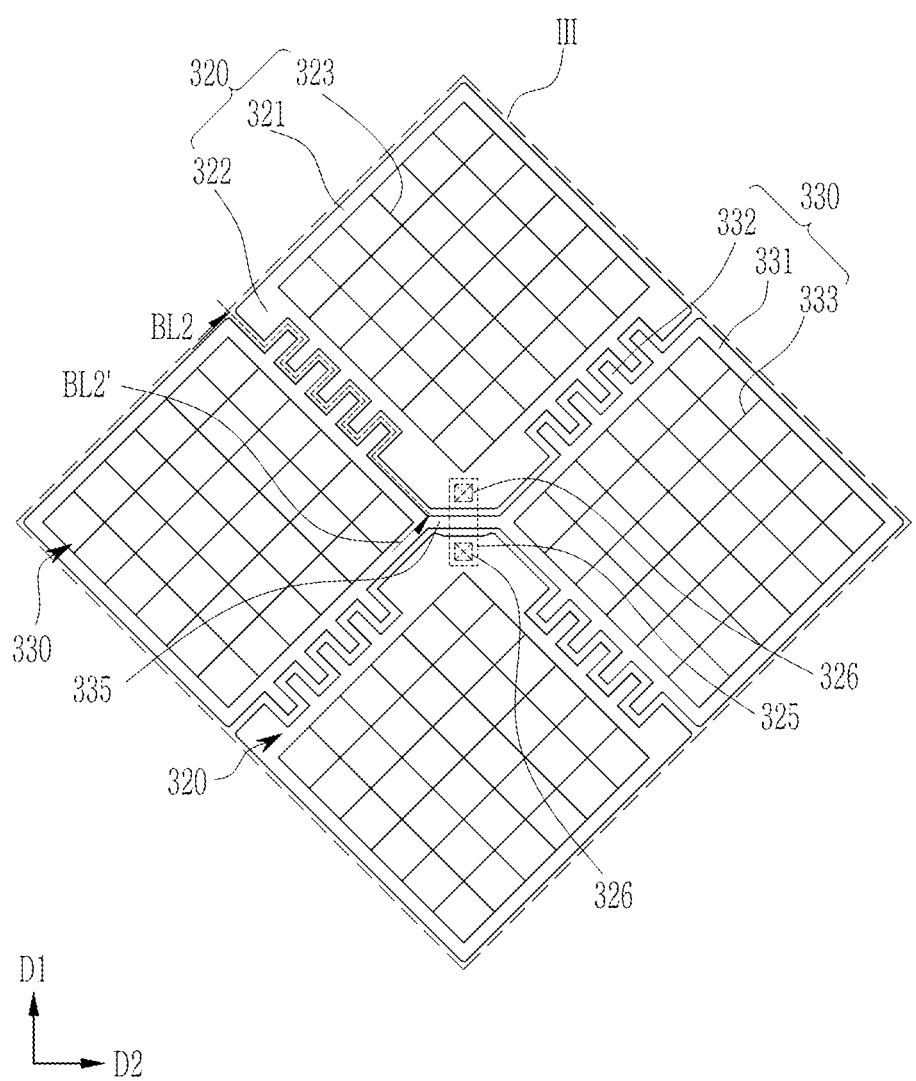
FIG. 3 shows an area III of FIG. 1 in further detail, according to an exemplary embodiment of the present invention.
Figure 4:
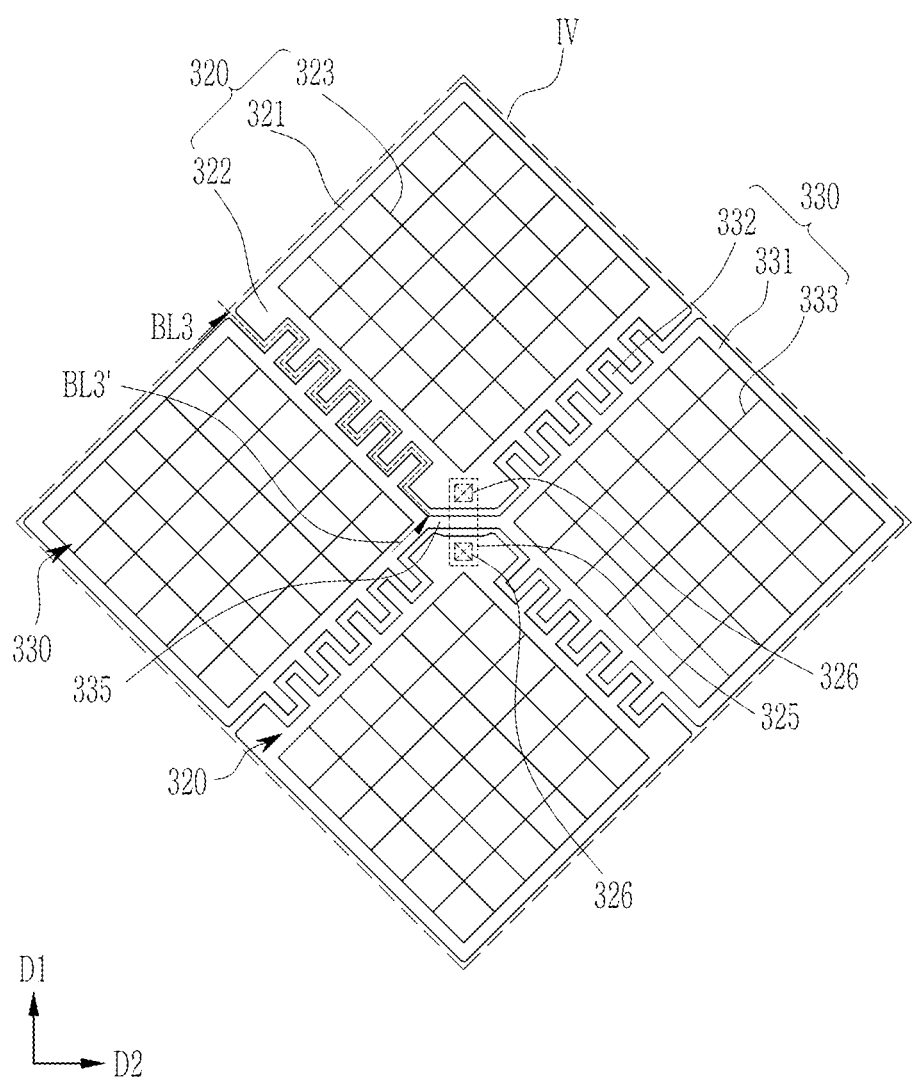
FIG. 4 shows an area IV of FIG. 1 in further detail, according to an exemplary embodiment of the present invention.

FIG. 1 shows a touch sensor according to an exemplary embodiment of the present invention. FIG. 2 shows an area II of FIG. 1 in further detail, according to an exemplary embodiment of the present invention. FIG. 3 shows an area III of FIG. 1 in further detail, according to an exemplary embodiment of the present invention. FIG. 4 shows an area IV of FIG. 1 in further detail, according to an exemplary embodiment of the present invention.

Referring to FIG. 1, a touch sensor 300 according to an exemplary embodiment includes a support layer 310, a plurality of first touch electrodes 320, a plurality of second touch electrodes 330, a plurality of first connecting wires 340, a plurality of second connecting wires 350, a pad portion 360, and a touch controller 370.

The first touch electrodes 320, the second touch electrodes 330, the first connecting wires 340, the second connecting wires 350, and the pad portion 360 may be disposed on the support layer 310. The support layer 310 may include a transparent insulator, such as glass or plastic. The support layer 310 may be an upper substrate of a display panel (not shown) or an encapsulation layer, which will be described in a latter part of this specification with reference to FIG. 11.

The support layer 310 may be divided into an active area AA and a peripheral area PA. The active area AA may be an area for detecting a touch position, and the peripheral area PA may be an area in which a wire for transmitting a signal for detecting a touch position is formed. The active area AA may substantially correspond to a display area for displaying an image in the display device.

The plurality of first touch electrodes 320 and the plurality of second touch electrodes 330 are disposed in the active area AA. A plurality of first touch electrodes 320 may be arranged in a matrix form, and may be connected to each other in a first direction D1. A plurality of second touch electrodes 330 may be arranged in a matrix form among the plurality of second touch electrodes 330 so as to not overlap a plurality of first touch electrodes 320, and may be connected to each other in a second direction D2. The plurality of first touch electrodes 320 and the plurality of second touch electrodes 330 are electrically separated from each other in the active area AA.

In an embodiment, the second direction D2 may be orthogonal to the first direction D1. For example, the first direction D1 may be a column direction, and the second direction D2 may be a row direction.

A plurality of first touch electrodes 320 connected in the first direction D1 along one column may form a first touch electrode column. A plurality of first touch electrodes 320 included in the first touch electrode column are electrically connected to each other. A plurality of first touch electrodes 320 may form a plurality of first touch electrode columns, and a plurality of first touch electrode columns may be arranged in the second direction D2.

A plurality of second touch electrodes 330 connected in the second direction D2 along one row may form a second touch electrode row. A plurality of second touch electrodes 330 included in the second touch electrode row are electrically connected to each other. A plurality of second touch electrodes 330 may form a plurality of second touch electrode rows, and a plurality of second touch electrode rows may be arranged in the first direction D1. A plurality of first touch electrode columns may traverse a plurality of second touch electrode rows.

An exemplary embodiment in which a plurality of first touch electrodes 320 are connected in the first direction D1 and an exemplary embodiment in which a plurality of second touch electrodes 330 are connected in the second direction D2 will be described in latter parts of this specification with reference to FIG. 2, FIG. 8, FIG. 9, and FIG. 10.

A plurality of first connecting wires 340, a plurality of second connecting wires 350, and the pad portion 360 may be disposed in the peripheral area PA. The pad portion 360 may be disposed on one edge of the support layer 310. For example, as shown in FIG. 1, the pad portion 360 may be disposed on an edge of the support layer 310 in the first direction D1 from the active area AA.

First connecting wires 340 of the plurality of first connecting wires 340 respectively include a first end connected to the first touch electrode column and a second end connected to the pad portion 360. That is, the first connecting wires 340 respectively connect the first touch electrode columns and the pad portion 360. For example, a plurality of first connecting wires 340 may be connected to a plurality of first touch electrode columns at an edge of the active area AA in the first direction D1.

Second connecting wires 350 of the plurality of second connecting wires 350 respectively include a first end connected to the second touch electrode row and a second end connected to the pad portion 360. That is, the second connecting wires 350 respectively connect the second touch electrode rows and the pad portion 360. For example, a plurality of second connecting wires 350 may be connected to a plurality of second touch electrode rows at an edge of the active area AA in the second direction D2.

In an embodiment, the pad portion 360 may be electrically connected to the touch controller 370 through a flexible circuit board (not shown). That is, a plurality of first touch electrode columns connected to a plurality of first connecting wires 340 may be connected to the touch controller 370 through the pad portion 360. A plurality of second touch electrode rows connected to a plurality of second connecting wires 350 may be connected to the touch controller 370 through the pad portion 360.

The touch controller 370 may apply a driving signal to a plurality of first touch electrodes 320 or a plurality of second touch electrodes 330 through a plurality of first connecting wires 340 or a plurality of second connecting wires 350. The touch controller 370 may receive a touch sensing signal to indicate a change of capacitance of a plurality of second touch electrodes 330 or a plurality of first touch electrodes 320 through a plurality of second connecting wires 350 or a plurality of first connecting wires 340, and may detect a touch position.

In an embodiment, for example, the touch controller 370 may sequentially apply a driving signal to a plurality of second touch electrodes 330 through a plurality of second connecting wires 350, and may receive a touch sensing signal for indicating a change of capacitance of a plurality of first touch electrodes 320 through a plurality of first connecting wires 340 to detect a touch position. In another embodiment, the touch controller 370 may sequentially apply a driving signal to a plurality of first touch electrodes 320 through a plurality of first connecting wires 340, and may receive a touch sensing signal for indicating a change of capacitance of a plurality of second touch electrodes 330 through a plurality of second connecting wires 350 to detect a touch position.

The active area AA may be divided into a plurality of sub-active areas AA1, AA2, and AA3. For example, the active area AA may be divided into a first sub-active area AA1, a second sub-active area AA2, and a third sub-active area AA3 in an order in the first direction D1 from the pad portion 360. Although the active area AA is shown, in an embodiment, to be divided into three sub-active areas AA1, AA2, and AA3, the number and size of the sub-active areas included in the active area AA are not limited.

A length of a border portion between the first touch electrode 320 and the second touch electrode 330 included in the first sub-active area AA1, a length of a border portion between the first touch electrode 320 and the second touch electrode 330 of the second sub-active area AA2, and a length of a border portion between the first touch electrode 320 and the second touch electrode 330 of the third sub-active area AA3 may be different from each other, such that uniformity of the touch sensing signal may not be deteriorated by the resistance of a plurality of first touch electrodes 320 and a plurality of second touch electrodes 330, which will now be described in further detail with reference to FIG. 2 to FIG. 4.

Figure 8:
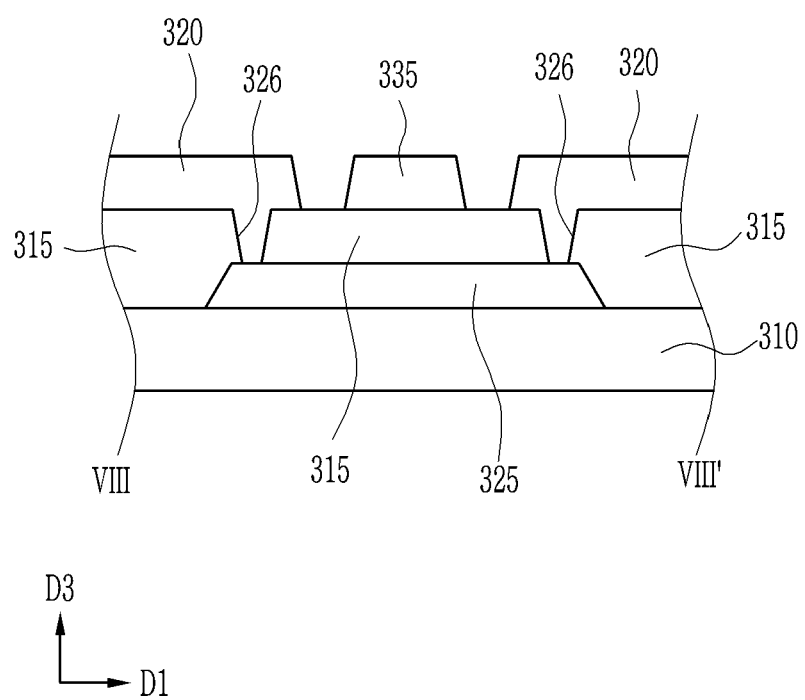
FIG. 8 shows a cross-sectional view with respect to a line VIII-VIII' of FIG. 2.

A configuration in which adjacent first touch electrodes 320 are connected to each other in the first direction D1 and a configuration in which adjacent second touch electrodes 330 are connected to each other in the second direction D2 according to an exemplary embodiment will now be described with reference to FIG. 2 and FIG. 8. FIG. 8 shows a cross-sectional view with respect to a line VIII-VIII' of FIG. 2.

Referring to FIG. 2 and FIG. 8, two second touch electrodes 330 that are adjacent in the second direction D2 may be connected to each other through a second connector 335. The second connector 335 may be formed on a same layer as the second touch electrode 330 with a same material. For example, the second connector 335 may be formed when the second touch electrode 330 is formed. The second touch electrode 330 and the second connector 335 may include a metal, such as a silver nanowire (AgNW), or a transparent conductive oxide (TCO), such as an indium tin oxide (ITO) or an indium zinc oxide (IZO).

Two first touch electrodes 320 that are adjacent in the first direction D1 may be connected to each other through a first connector 325. The first connector 325 may extend in the first direction D1 between the two first touch electrodes 320 that are adjacent in the first direction D1 to overlap with part of the first touch electrode 320 and overlap with part of the second connector 335. The first connector 325 may be disposed on a different layer from the first touch electrode 320, and may be connected to the first touch electrode 320 through a contact hole 326.

For example, as shown in FIG. 8, a first connector 325 may be disposed on a support layer 310, an insulating layer 315 may be disposed on the first connector 325, and a first touch electrode 320 and a second connector 335 may be disposed on the insulating layer 315. The second connector 335 is disposed on the same layer as the second touch electrode 330, such that the second touch electrode 330 may be disposed on the insulating layer 315. The insulating layer 315 may include a contact hole 326 formed at a position where the first connector 325 overlaps with the first touch electrode 320 in a third direction D3, and when the first touch electrode 320 is formed, a material forming the first touch electrode 320 may be injected into the contact hole 326 and the first touch electrode 320 may be connected to the first connector 325. Accordingly, the two first touch electrodes 320 that are adjacent in the first direction D1 may be connected to each other through the first connector 325. The first touch electrode 320 and the first connector 325 may include a metal, such as a silver nanowire (AgNW), or a transparent conductive oxide (TCO), such as an indium tin oxide (ITO) or an indium zinc oxide (IZO). The third direction D3 may be orthogonal to the first direction D1 and the second direction D2.

Here, it is exemplified that there is one first connector 325 for connecting the two first touch electrodes 320 that are adjacent in the first direction D1 to each other; however, a plurality of first connectors 325 may connect the two first touch electrodes 320 that are adjacent in the first direction D1.

The configuration for the first connector 325 shown in FIG. 8 to connect the two first touch electrodes 320 that are adjacent in the first direction D1 to each other may be applied to the embodiments shown in FIG. 3 to FIG. 7, and repeated descriptions will not be provided.

A configuration for preventing or substantially preventing uniformity of the touch sensing signal from being deteriorated by resistance of a plurality of first touch electrodes 320 and a plurality of second touch electrodes 330 will now be described with reference to FIG. 2 to FIG. 4.

In an embodiment, referring to FIG. 2, the first touch electrode 320 includes a first body portion 321, at least one first protrusion 322, and a first mesh portion 323, and the second touch electrode 330 includes a second body portion 331, at least one second protrusion 332, and a second mesh portion 333.

In an embodiment, the first body portion 321 may have a rhombus (or quadrangular) shape with its empty internal portion on a plane. Here, the plane means a side that is parallel to the first direction D1 and the second direction D2. The first mesh portion 323 is disposed in the first body portion 321. The first mesh portion 323 may include a plurality of conductive fine lines. However, the first mesh portion 323 may be omitted depending on an exemplary embodiment. If the first mesh portion 323 is omitted, the internal portion of the first body portion 321 may be empty, a pattern (e.g., a predetermined pattern) may be added thereto, or it may be filled with a same material as the first body portion 321.

At least one first protrusion 322 is disposed at an edge of the first body portion 321. The first protrusion 322 may have a shape protruding toward the second body portion 331 of the second touch electrode 330 that is adjacent on respective sides of the first body portion 321. The first protrusion 322 is connected to the first body portion 321, and it is separated from the second body portion 331 of the adjacent second touch electrode 330 by a distance (e.g., a predetermined distance).

In an embodiment, the second body portion 331 may have a rhombus (or quadrangular) shape with its empty internal portion on a plane. The second mesh portion 333 is disposed in the second body portion 331, and the second mesh portion 333 may include a plurality of conductive fine lines. However, the second mesh portion 333 may be omitted depending on an exemplary embodiment. If the second mesh portion 333 is omitted, the internal portion of the second body portion 331 may be empty, a pattern (e.g., a predetermined pattern) may be added thereto, or it may be filled with a same material as the second body portion 331.

At least one second protrusion 332 is disposed at an edge of the second body portion 331. The second protrusion 332 may have a shape protruding toward the first body portion 321 of the first touch electrode 320 that is adjacent on respective sides of the second body portion 331. The second protrusion 332 is connected to the second body portion 331 and is separated from the first body portion 321 of the adjacent first touch electrode 320 by a distance (e.g., a predetermined distance).

The first protrusion 322 and the second protrusion 332 are disposed to interlock with each other and do not overlap each other on a plane view. That is, the first protrusion 322 is separated from the second protrusion 332 by a distance (e.g., a predetermined distance).

As described, the first body portion 321 and the first protrusion 322 of the first touch electrode 320 are adjacent to the second body portion 331 and the second protrusion 332 of the second touch electrode 330 with a gap area therebetween. The gap area is referred to as a border portion between the first touch electrode 320 and the second touch electrode 330.

In an embodiment, as exemplified in FIG. 2, four first protrusions 322 are disposed at one side of the first touch electrode 320, three second protrusions 332 are disposed at one side of the second touch electrode 330, and the four first protrusions 322 and the three second protrusions 332 are disposed to interlock with each other. A first border portion (BL1-BL1') is disposed between the adjacent first touch electrode 320 and second touch electrode 330. The first border portion (BL1-BL1') may have a zigzag pattern according to a form in which the four first protrusions 322 interlock with the three second protrusions 332.

In an embodiment, the first protrusions 322 and the second protrusions 332 are exemplified to substantially have bar or quadrangular shapes; however, the shapes of the first protrusions 322 and the second protrusions 332 are not limited. For example, the first protrusions 322 and the second protrusions 332 may have triangular or semi-circular shapes.

Referring to FIG. 3, five first protrusions 322 are disposed at one side of the first touch electrode 320, four second protrusions 332 are disposed at one side of the second touch electrode 330, and the five first protrusions 322 and the four second protrusions 332 are disposed to interlock with each other. A second border portion (BL2-BL2') is disposed between the adjacent first touch electrode 320 and second touch electrode 330. The second border portion (BL2-BL2') may have a zigzag pattern according to a form in which the five first protrusions 322 interlock with the four second protrusions 332.

Except for the above-noted difference, characteristics of an exemplary embodiment described with reference to FIG. 2 may be applied to an exemplary embodiment described with reference to FIG. 3, and repeated descriptions between exemplary embodiments will not be provided.

Referring to FIG. 4, six first protrusions 322 are disposed at one side of the first touch electrode 320, five second protrusions 332 are disposed at one side of the second touch electrode 330, and the six first protrusions 322 and the five second protrusions 332 are disposed to interlock with each other. A third border portion (BL3-BL3') is disposed between the adjacent first touch electrode 320 and second touch electrode 330. The third border portion (BL3-BL3') may have a zigzag pattern according to a form in which the six first protrusions 322 interlock with the five second protrusions 332.

Except for the above-noted difference, characteristics of an exemplary embodiment described with reference to FIG. 2 may be applied to an exemplary embodiment described with reference to FIG. 4, and repeated descriptions between exemplary embodiments will not be provided.

Referring to FIG. 1 to FIG. 4, the first touch electrode 320 and the second touch electrode 330 of FIG. 2 are included in the first sub-active area AA1, the first touch electrode 320 and the second touch electrode 330 of FIG. 3 are included in the second sub-active area AA2, and the first touch electrode 320 and the second touch electrode 330 of FIG. 4 are included in the third sub-active area AA3.

A length of the first border portion (BL1-BL1') between the first touch electrode 320 and the second touch electrode 330 of FIG. 2, a length of the second border portion (BL2-BL2') between the first touch electrode 320 and the second touch electrode 330 of FIG. 3, and a length of the third border portion (BL3-BL3') between the first touch electrode 320 and the second touch electrode 330 of FIG. 4 may be determined by the number of the first protrusions 322 and the second protrusions 332. The number of the first protrusions 322 and the second protrusions 332 of the first touch electrode 320 and the second touch electrode 330 disposed in the second sub-active area AA2 is greater than the number of the first protrusions 322 and the second protrusions 332 of the first touch electrode 320 and the second touch electrode 330 disposed in the first sub-active area AA1, and the number of the first protrusions 322 and the second protrusions 332 of the first touch electrode 320 and the second touch electrode 330 disposed in the third sub-active area AA3 is greater than the number of the first protrusions 322 and the second protrusions 332 of the first touch electrode 320 and the second touch electrode 330 disposed in the second sub-active area AA2. Therefore, the second border portion (BL2-BL2') is longer than the first border portion (BL1-BL1'), and the third border portion (BL3-BL3') is longer than the second border portion (BL2-BL2').

As the second border portion (BL2-BL2') becomes longer than the first border portion (BL1-BL1'), capacitance between the first touch electrode 320 and the second touch electrode 330 disposed in the second sub-active area AA2 becomes greater than capacitance between the first touch electrode 320 and the second touch electrode 330 disposed in the first sub-active area AA1. As the third border portion (BL3-BL3') becomes longer than the second border portion (BL2-BL2'), capacitance between the first touch electrode 320 and the second touch electrode 330 disposed in the third sub-active area AA3 becomes greater than capacitance between the first touch electrode 320 and the second touch electrode 330 disposed in the second sub-active area AA2.

The second sub-active area AA2 is disposed to be further distant from the pad portion 360 than the first sub-active area AA1, such that the touch sensing signal received from the first touch electrode 320 or the second touch electrode 330 disposed in the second sub-active area AA2 may become weaker than the touch sensing signal received from the first touch electrode 320 or the second touch electrode 330 disposed in the first sub-active area AA1 by its resistance, but the touch sensing signal weakened by the resistance may be compensated by increasing capacitance between the first touch electrode 320 and the second touch electrode 330 disposed in the second sub-active area AA2. Resistance of the first touch electrode 320 and the second touch electrode 330 becomes greater at a greater distance from the pad portion 360.

Further, the third sub-active area AA3 is disposed to be further distant from the pad portion 360 than the second sub-active area AA2, such that the touch sensing signal received from the first touch electrode 320 or the second touch electrode 330 disposed in the third sub-active area AA3 may be weaker than the touch sensing signal received from the first touch electrode 320 or the second touch electrode 330 disposed in the second sub-active area AA2 by its resistance, but the touch sensing signal weakened by the resistance may be compensated by increasing capacitance between the first touch electrode 320 and the second touch electrode 330 disposed in the third sub-active area AA3.

Accordingly, uniformity of the touch sensing signal of the first to third sub-active areas AA1, AA2, and AA3 may be improved. That is, the touch sensing signal may be uniformly or substantially uniformly received by the touch controller 370 regardless of the position of the first touch electrode 320 and the second touch electrode 330. In addition, attenuation of the touch sensing signal from the first touch electrode 320 or the second touch electrode 330 disposed far from the pad portion 360 by its resistance may be compensated, thereby improving touch sensing performance of the touch sensor 300.

In an embodiment, the active area AA has been exemplified to be divided into three sub-active areas AA1, AA2, and AA3; however, the number and size of the sub-active areas included in the active area AA are not limited, and the active area AA may be divided into a plurality of sub-active areas such that the border portion between the first touch electrode 320 and the second touch electrode 330 may gradually become longer as a distance in the first direction D1 from the pad portion 360 increases.

As shown with reference to FIG. 2 to FIG. 4, the number of the first protrusions 322 of the first touch electrode 320 and the second protrusions 332 of the second touch electrode 330 disposed in the second sub-active area AA2 may be greater than the number of the first protrusions 322 of the first touch electrode 320 and the second protrusions 332 of the second touch electrode 330 disposed in the first sub-active area AA1, and the number of the first protrusions 322 of the first touch electrode 320 and the second protrusions 332 of the second touch electrode 330 disposed in the third sub-active area AA3 may be greater than the number of the first protrusions 322 of the first touch electrode 320 and the second protrusions 332 of the second touch electrode 330 disposed in the second sub-active area AA2.

In another embodiment, the number of the first protrusions 322 of the first touch electrode 320 may be the same in the first to third active areas AA1, AA2, and AA3, the number of the second protrusions 332 of the second touch electrode 330 may be the same in the first to third active areas AA1, AA2, and AA3, and uniformity of the touch sensing signal may be improved by changing the sizes of the first protrusions 322 and the second protrusions 332, which will now be described with reference to FIG. 5 to FIG. 7.

Figure 5:
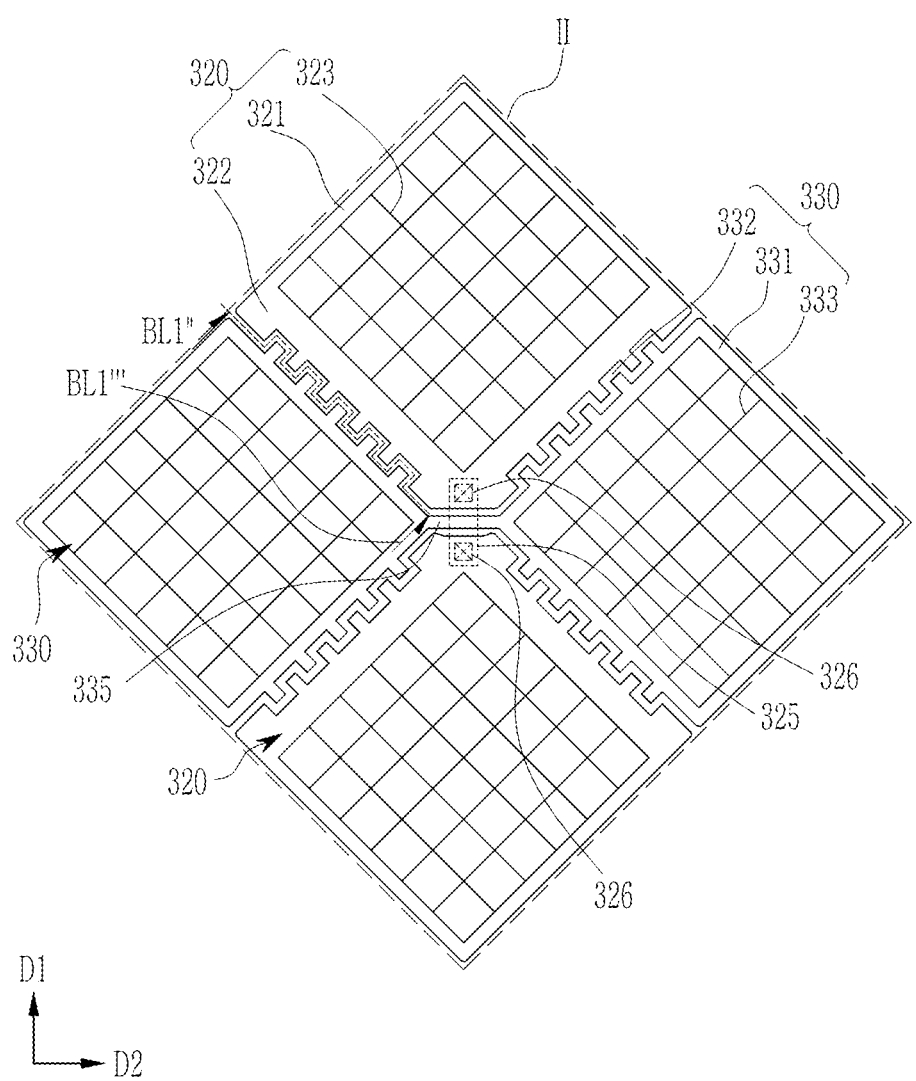
FIG. 5 shows an area corresponding to the area II of FIG. 1 in further detail, according to another exemplary embodiment of the present invention.

FIG. 5 shows an area corresponding to the area II of FIG. 1 in further detail, according to another exemplary embodiment of the present invention. FIG. 6 shows an area corresponding to the area III of FIG. 1 in further detail, according to another exemplary embodiment of the present invention. FIG. 7 shows an area corresponding to the area IV of FIG. 1 in further detail, according to another exemplary embodiment of the present invention.

Referring to FIG. 5, six first protrusions 322 are disposed at one side of the first touch electrode 320, five second protrusions 332 are disposed at one side of the second touch electrode 330, and the six first protrusions 322 and the five second protrusions 332 are disposed to interlock with each other. A first border portion (BL1"-BL1''') is disposed between the adjacent first touch electrode 320 and second touch electrode 330. The first border portion (BL1"-BL1''') may have a zigzag pattern depending on a form in which the six first protrusions 322 interlock with the five second protrusions 332. Compared to the sizes of the first protrusion 322 and the second protrusion 332 of FIG. 4, the first protrusion 322 and the second protrusion 332 of FIG. 5 may have ⅓ the size thereof.

Except for the above-noted difference, characteristics of an exemplary embodiment described with reference to FIG. 2 may be applied to an exemplary embodiment described with reference to FIG. 5, and repeated descriptions between exemplary embodiments will not be provided.

Figure 6:
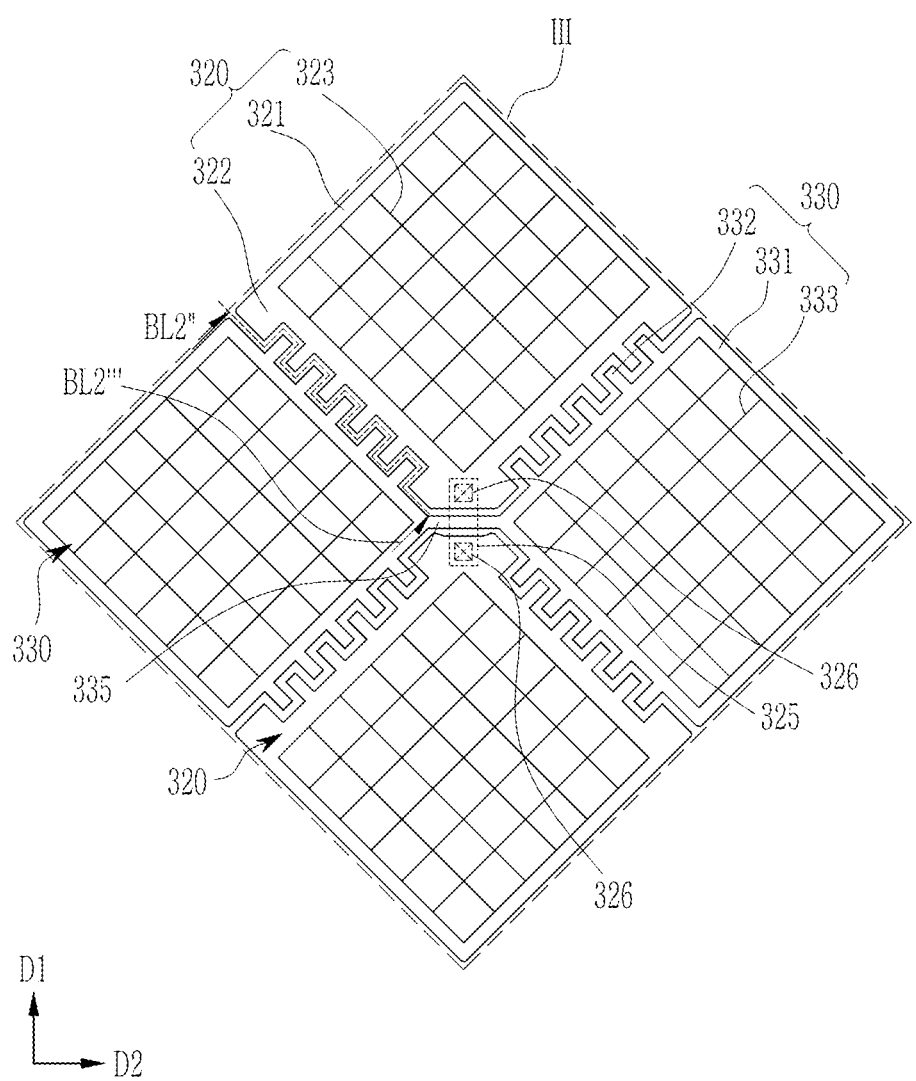
FIG. 6 shows an area corresponding to the area III of FIG. 1 in further detail, according to another exemplary embodiment of the present invention.

Referring to FIG. 6, six first protrusions 322 are disposed at one side of the first touch electrode 320, five second protrusions 332 are disposed at one side of the second touch electrode 330, and the six first protrusions 322 and the five second protrusions 332 are disposed to interlock with each other. A second border portion (BL2"-BL2''') is disposed between the adjacent first touch electrode 320 and second touch electrode 330. The second border portion (BL2"-BL2''') may have a zigzag pattern depending on a form in which the six first protrusions 322 interlock with the five second protrusions 332. Compared to the sizes of the first protrusion 322 and the second protrusion 332 of FIG. 4, the first protrusion 322 and the second protrusion 332 of FIG. 6 may have ⅔ the size thereof.

Except for the above-noted difference, characteristics of an exemplary embodiment described with reference to FIG. 2 may be applied to an exemplary embodiment described with reference to FIG. 6, and repeated descriptions between exemplary embodiments will not be provided.

Figure 7:
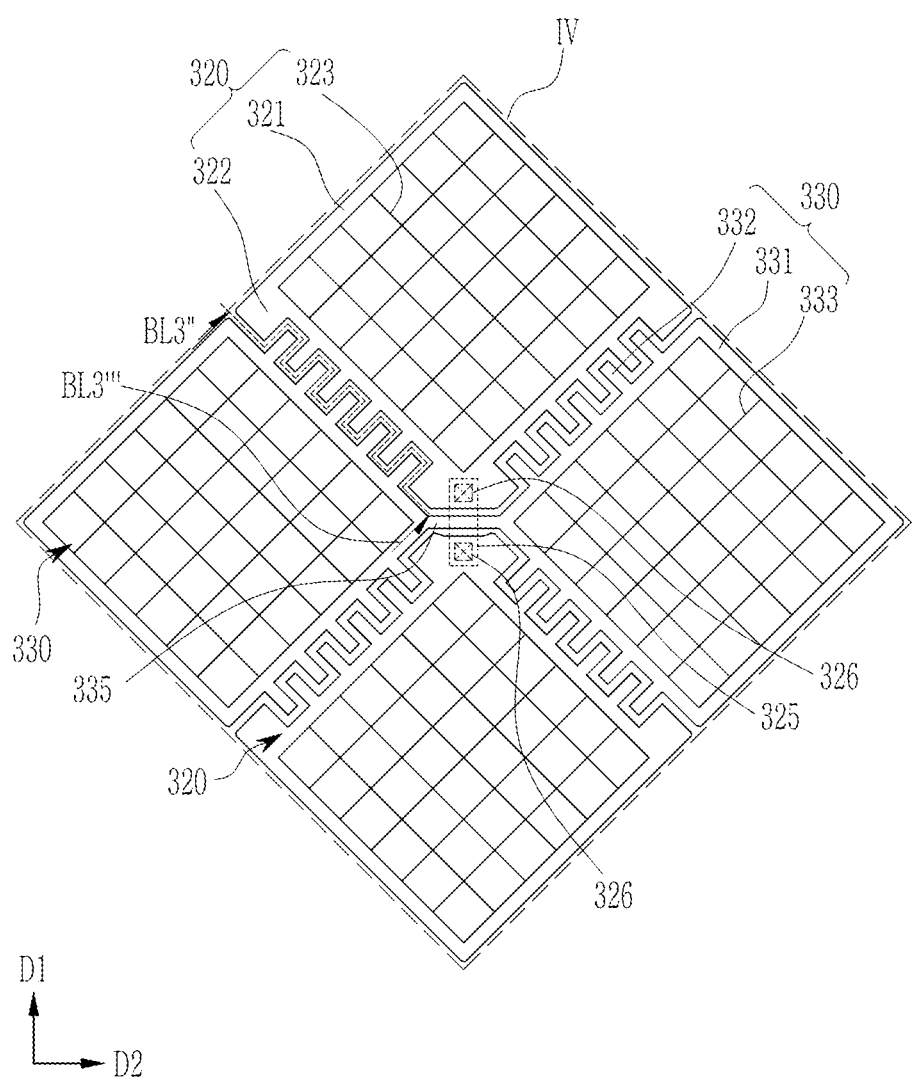
FIG. 7 shows an area corresponding to the area IV of FIG. 1 in further detail, according to another exemplary embodiment of the present invention.

Referring to FIG. 7, six first protrusions 322 are disposed at one side of the first touch electrode 320, five second protrusions 332 are disposed at one side of the second touch electrode 330, and the six first protrusions 322 and the five second protrusions 332 are disposed to interlock with each other. A third border portion (BL3"-BL3''') is disposed between the adjacent first touch electrode 320 and second touch electrode 330. The third border portion (BL3"-BL3''') may have a zigzag pattern depending on a form in which the six first protrusions 322 interlock with the five second protrusions 332. Compared to the sizes of the first protrusion 322 and the second protrusion 332 of FIG. 4, the first protrusion 322 and the second protrusion 332 of FIG. 7 may have the same size.

Except for the above-noted difference, characteristics of an exemplary embodiment described with reference to FIG. 2 may be applied to an exemplary embodiment described with reference to FIG. 7, and repeated descriptions between exemplary embodiments will not be provided.

Referring to FIG. 1 and FIG. 5 to FIG. 7, the first touch electrode 320 and the second touch electrode 330 of FIG. 5 are included in the first sub-active area AA1, the first touch electrode 320 and the second touch electrode 330 of FIG. 6 are included in the second sub-active area AA2, and the first touch electrode 320 and the second touch electrode 330 of FIG. 7 are included in the third sub-active area AA3.

A length of the first border portion (BL1"-BL1''') between the first touch electrode 320 and the second touch electrode 330 of FIG. 5, a length of the second border portion (BL2"-BL2''') between the first touch electrode 320 and the second touch electrode 330 of FIG. 6, and a length of the third border portion (BL3"-BL3''') between the first touch electrode 320 and the second touch electrode 330 of FIG. 7 may be determined by the size of the first protrusion 322 and the second protrusion 332. The first protrusion 322 and the second protrusion 332 of the first touch electrode 320 and the second touch electrode 330 disposed in the second sub-active area AA2 are larger than the first protrusion 322 and the second protrusion 332 of the first touch electrode 320 and the second touch electrode 330 disposed in the first sub-active area AA1, and the first protrusion 322 and the second protrusion 332 of the first touch electrode 320 and the second touch electrode 330 disposed in the third sub-active area AA3 are larger than the first protrusion 322 and the second protrusion 332 of the first touch electrode 320 and the second touch electrode 330 disposed in the second sub-active area AA2. Accordingly, the second border portion (BL2"-BL2''') of FIG. 6 is longer than the first border portion (BL1"-BL1''') of FIG. 5, and the third border portion (BL3"-BL3''') of FIG. 7 is longer than the second border portion (BL2"-BL2''') of FIG. 6.

As the second border portion (BL2"-BL2''') becomes longer than the first border portion (BL1"-BL1'''), capacitance between the first touch electrode 320 and the second touch electrode 330 disposed in the second sub-active area AA2 becomes greater than capacitance between the first touch electrode 320 and the second touch electrode 330 disposed in the first sub-active area AA1. As the third border portion (BL3"-BL3''') becomes longer than the second border portion (BL2"-BL2'''), capacitance between the first touch electrode 320 and the second touch electrode 330 disposed in the third sub-active area AA3 becomes greater than capacitance between the first touch electrode 320 and the second touch electrode 330 disposed in the second sub-active area AA2.

Therefore, the touch sensing signal with higher resistance may be compensated by increasing capacitance between the first touch electrode 320 and the second touch electrode 330 disposed in the second sub-active area AA2. The touch sensing signal with higher resistance may be compensated by increasing capacitance between the first touch electrode 320 and the second touch electrode 330 disposed in the third sub-active area AA3.

Accordingly, uniformity of the touch sensing signal of the first to third sub-active areas AA1, AA2, and AA3 may be improved. That is, the touch sensing signal may be uniformly or substantially uniformly received by the touch controller 370 regardless of the position of the first touch electrode 320 and the second touch electrode 330. In addition, attenuation of the touch sensing signal from the first touch electrode 320 or the second touch electrode 330 disposed far from the pad portion 360 by its resistance may be compensated, thereby improving touch sensing performance of the touch sensor 300.

A configuration of a touch sensor according to another exemplary embodiment will now be described with reference to FIG. 9 and FIG. 10.

Figure 9:
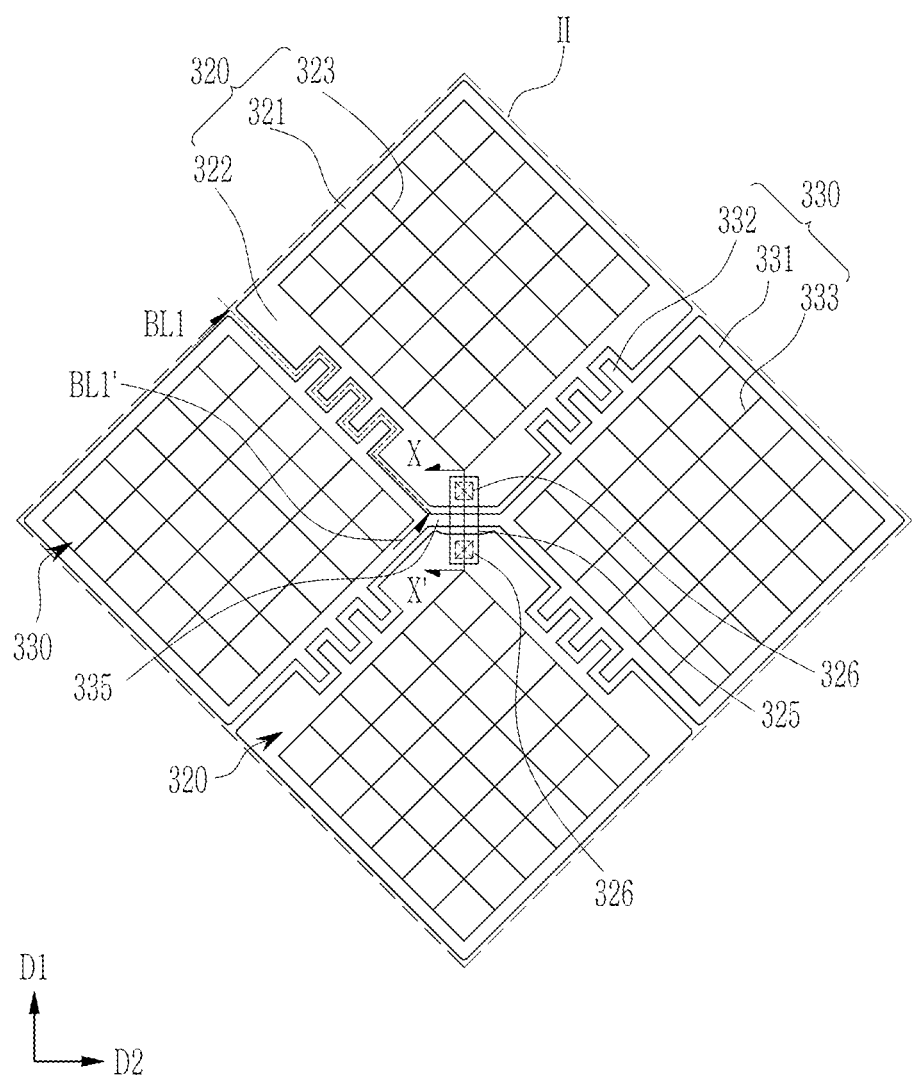
FIG. 9 shows a connection structure of a first touch electrode according to an exemplary embodiment of the present invention.

FIG. 9 shows a connection structure of a first touch electrode according to another exemplary embodiment of the present invention. FIG. 10 shows a cross-sectional view with respect to a line X-X' of FIG. 9.

Figure 10:
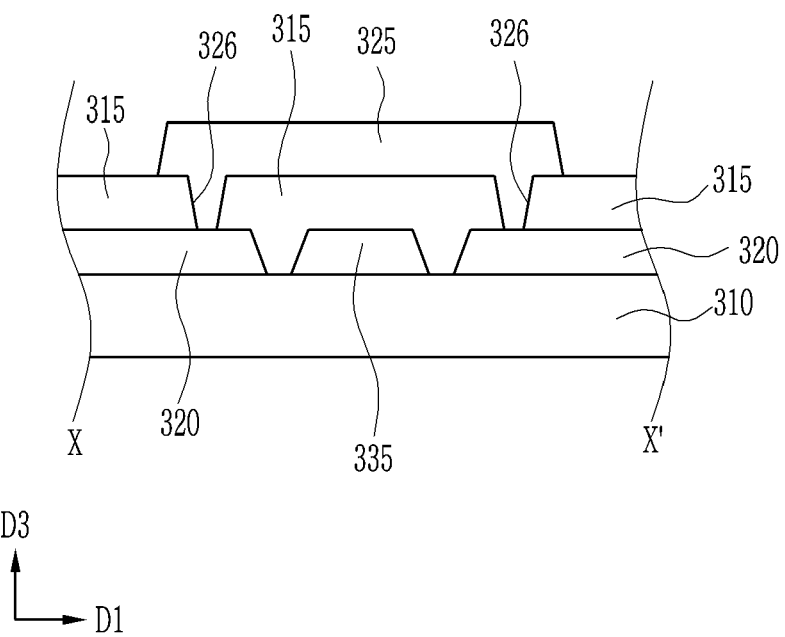
FIG. 10 shows a cross-sectional view with respect to a line X-X' of FIG. 9.

Referring to FIG. 9 and FIG. 10, two second touch electrodes 330 that are adjacent in the second direction D2 may be connected to each other through the second connector 335. Two first touch electrodes 320 that are adjacent in the first direction D1 may be connected to each other through the first connector 325.

The first touch electrode 320, the second touch electrode 330, and the second connector 335 are disposed on a support layer 310. An insulating layer 315 may be disposed on the first touch electrode 320, the second touch electrode 330, and the second connector 335, and the first connector 325 may be disposed on the insulating layer 315. The insulating layer 315 may include a contact hole 326 formed on a position where the first connector 325 overlaps with the first touch electrode 320 in the third direction D3, and when the first connector 325 is formed, a material forming the first connector 325 may be injected into the contact hole 326 to connect the first touch electrode 320 and the first connector 325. Accordingly, two first touch electrodes 320 that are adjacent in the first direction D1 may be connected to each other through the first connector 325 disposed on the insulating layer 315.

Except for the above-noted difference, characteristics of an exemplary embodiment described with reference to FIG. 2 and FIG. 8 may be applied to an exemplary embodiment described with reference to FIG. 9 and FIG. 10, and repeated descriptions between exemplary embodiments will not be provided.

The first touch electrode 320 and the second touch electrode 330 shown in FIG. 9 may be disposed in the first sub-active area AA1 of FIG. 1. Further, the configuration in which the second connector 335 shown in FIG. 9 and FIG. 10 is disposed with the first touch electrode 320 and the second touch electrode 330 to connect the adjacent second touch electrode 330 is applicable to FIG. 3 to FIG. 7, and repeated descriptions thereof will not be provided.

A display device to which the above-described touch sensor 300 is applicable will now be described with reference to FIG. 11.

Figure 11:
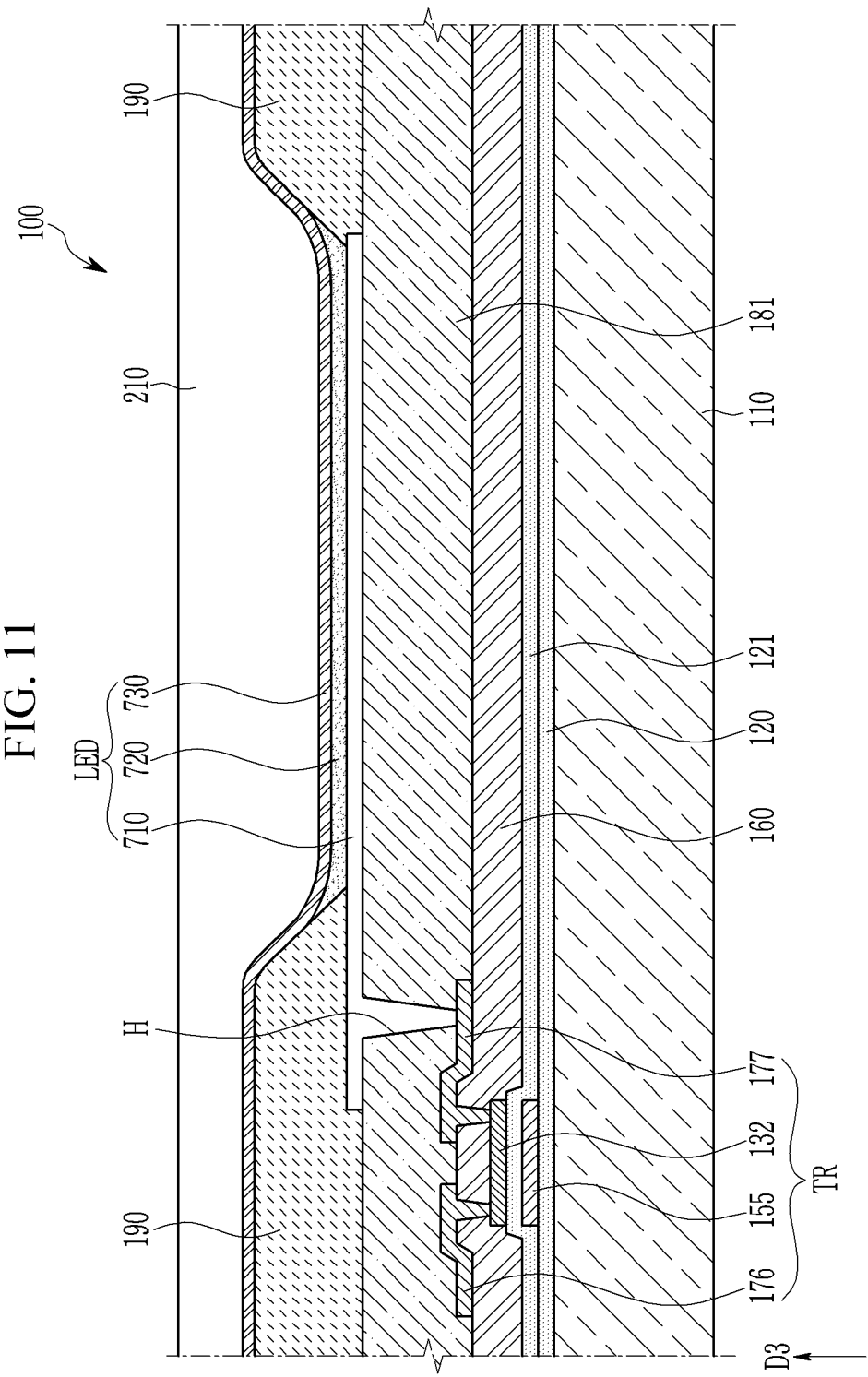
FIG. 11 shows a display device according to an exemplary embodiment of the present invention.

FIG. 11 shows a display device according to an exemplary embodiment. FIG. 11 shows a cross-sectional view of a driving transistor and a light-emitting device in a display panel 100.

Referring to FIG. 11, the display panel 100 includes a substrate 110, a driving transistor TR, a light-emitting device LED, and an encapsulation layer 210.

The substrate 110 includes an insulating material, such as glass or plastic, and a buffer layer 120 is disposed on the substrate 110. The buffer layer 120 prevents or substantially prevents permeation of undesired elements, such as impurities or moisture, and planarizes a surface on which the driving transistor TR is disposed. However, the buffer layer 120 may be omitted depending on a type of the substrate 110 and a processing condition.

A gate electrode 155 is disposed on the buffer layer 120. A first insulating layer 121 is disposed on the gate electrode 155 and the buffer layer 120. A semiconductor layer 132 made of amorphous silicon, polysilicon, or an oxide semiconductor is disposed on the first insulating layer 121. The semiconductor layer 132 overlaps the gate electrode 155. The first insulating layer 121 may have a single-layered structure made of a silicon nitride or a silicon oxide, for example, or a dual-layer structure in which a silicon nitride and a silicon oxide are stacked. A second insulating layer 160 is disposed on the semiconductor layer 132 and the first insulating layer 121. A source electrode 176 and a drain electrode 177 facing each other are disposed on the second insulating layer 160. The source electrode 176 may be connected to a first end of the semiconductor layer 132 through a contact hole passing through the second insulating layer 160. The drain electrode 177 may be connected to a second end of the semiconductor layer 132 through another contact hole passing through the second insulating layer 160. The gate electrode 155, the source electrode 176, the drain electrode 177, and the semiconductor layer 132 form the driving transistor TR. A channel of the driving transistor TR is formed on the semiconductor layer 132 between the source electrode 176 and the drain electrode 177.

A third insulating layer 181 is disposed on the driving transistor TR and the exposed second insulating layer 160. The third insulating layer 181 may include an organic insulating material or an inorganic insulating material. A pixel electrode 710 is disposed on the third insulating layer 181, and the pixel electrode 710 is connected to the drain electrode 177 of the driving transistor TR through a first contact hole H passing through the third insulating layer 181. The driving transistor TR provides a current corresponding to a data voltage to the pixel electrode 710. An emission layer 720 is disposed on the pixel electrode 710, and a power electrode 730 is disposed on the emission layer 720. The emission layer 720 may include at least one of an organic light-emitting material and an inorganic light-emitting material. One of the pixel electrode 710 and the power electrode 730 may be a reflective electrode, and the other may be a semi-transmittable electrode. For example, in a case of a top emission type of display device, the pixel electrode 710 may be a reflective electrode, and the power electrode 730 may be a semi-transmittable electrode.

The pixel electrode 710, the emission layer 720, and the power electrode 730 form the light-emitting device LED. The pixel electrode 710 may be an anode of the light-emitting device LED, and the power electrode 730 may be a cathode of the light-emitting device LED. Alternatively, depending on an exemplary embodiment, the pixel electrode 710 may be a cathode of the light-emitting device LED, and the power electrode 730 may be an anode of the light-emitting device LED. Holes and electrons from the pixel electrode 710 and the power electrode 730 are injected into the emission layer 720, and light emits when excitons that are combinations of the injected holes and electrons enter a ground state from an excited state. The light-emitting device LED may emit a light of the primary colors. For example, the primary colors may be three primary colors including red, green, and blue. Another example of the primary colors may be yellow, cyan, and magenta.

Light output by the emission layer 720 is reflected on the pixel electrode 710 to progress in the direction of the power electrode 730, part of the light that is input to the power electrode 730 transmits through the power electrode 730 to progress in the third direction D3 (i.e. to a user side), and the rest of the light progresses in the direction of the pixel electrode 710.

In an embodiment, the pixel electrode 710 includes a metal material with high reflectivity, and the power electrode 730 include a metal material with a transflective characteristic, and light output by the emission layer 720 resonates between the pixel electrode 710 and the power electrode 730 to amplify light with a specific wavelength and output the same in the third direction D3, thereby increasing optical efficiency and color reproducibility.

A pixel defining layer 190 for defining an area of the light-emitting device LED, that is, a pixel area for emitting light may be disposed near the pixel electrode 710. The pixel defining layer 190 may be disposed on part of the pixel electrode 710, and the emission layer 720 may be disposed on the pixel electrode 710 not covered by the pixel defining layer 190. The area in which the emission layer 720 is disposed may be a pixel area.

An encapsulation layer 210 for protecting the light-emitting device LED may be disposed on the light-emitting device LED. In an embodiment, the encapsulation layer 210 may include a structure in which an organic layer including an organic insulating material and an inorganic layer including an inorganic insulating material are alternately stacked.

The encapsulation layer 210 may be a support layer 310 of the touch sensor 300 described with reference to FIG. 8 and FIG. 10. That is, the encapsulation layer 210 may be the support layer 310 shown in FIG. 8, the first connector 325 may be disposed on the encapsulation layer 210, the insulating layer 315 may be disposed on the first connector 325, and the first touch electrode 320, the second touch electrode 330, and the second connector 335 may be disposed on the insulating layer 315. In another embodiment, the encapsulation layer 210 may be the support layer 310 shown in FIG. 10, the first touch electrode 320, the second touch electrode 330, and the second connector 335 may be disposed on the encapsulation layer 210, the insulating layer 315 may be disposed on the first touch electrode 320, the second touch electrode 330, and the second connector 335, and the first connector 325 may be disposed on the insulating layer 315.

As described, the touch sensor 300 including the first touch electrode 320 and the second touch electrode 330 may be disposed on the encapsulation layer 210 of the display panel 100 to configure a display device including a touch function.

It is desirable for the encapsulation layer 210 of the display panel 100 to have a constant thickness in the active area AA, and in a process for manufacturing a display device, the encapsulation layer 210 may become thinner toward the edge of the display panel 100. In this case, the first touch electrode 320 and the second touch electrode 330 disposed on the edge of the active area AA may be substantially influenced by parasitic capacitance with the power electrode 730 or the pixel electrode 710 disposed below the encapsulation layer 210. By the above-noted parasitic capacitance, the touch sensing signal from the first touch electrode 320 and the second touch electrode 330 disposed on the edge of the active area AA may be deteriorated, which may be solved or improved as described below with reference to FIG. 12 and FIG. 13.

Figure 12:
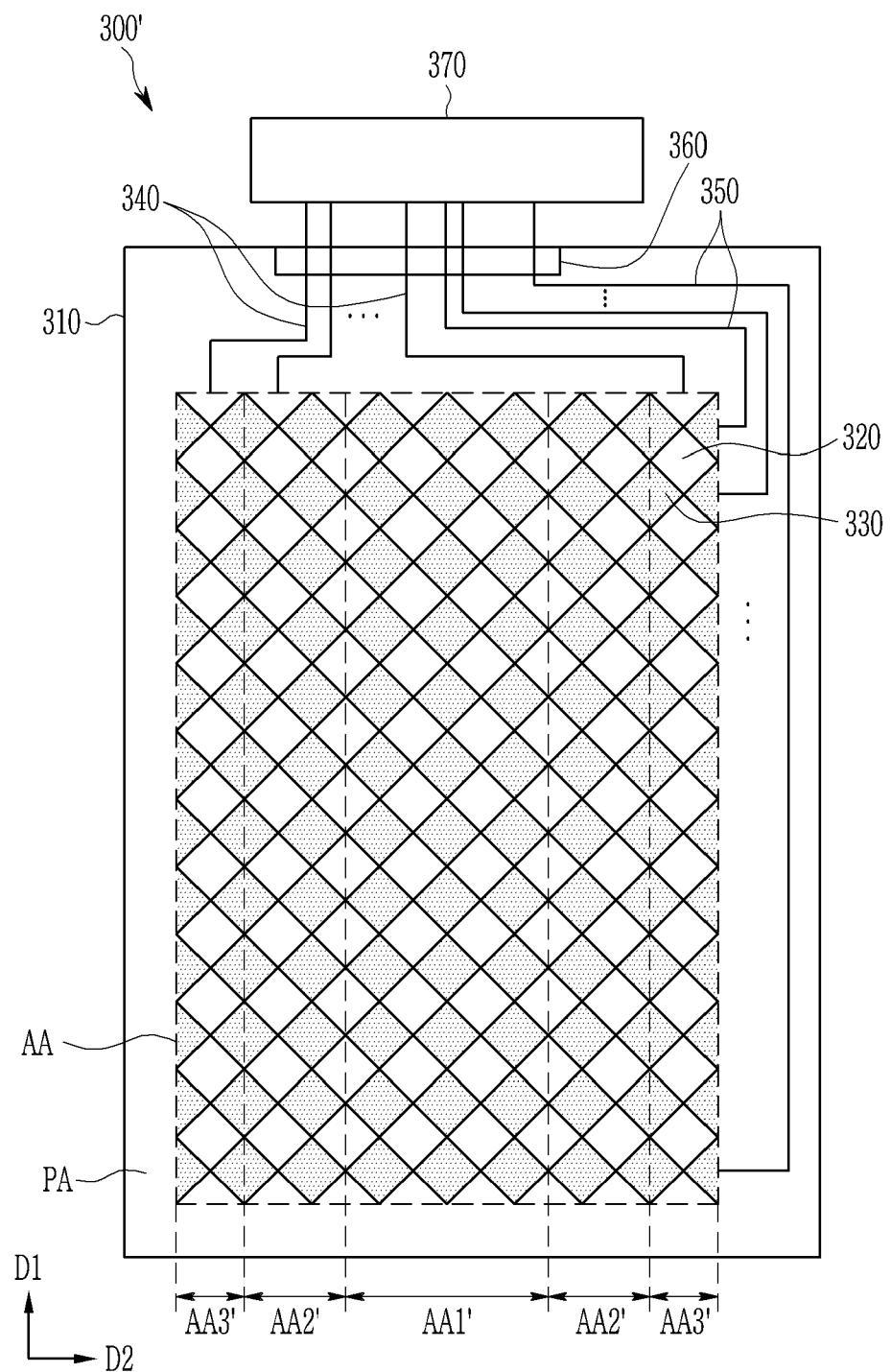
FIG. 12 shows a touch sensor according to another exemplary embodiment of the present invention.

FIG. 12 shows a touch sensor 300' according to another exemplary embodiment of the present invention.

Referring to FIG. 12, the active area AA includes a first sub-active area AA1', a second sub-active area AA2', and a third sub-active area AA3'. The first sub-active area AA1' may be disposed in a center between respective edges of the active area AA in the second direction D2, the second sub-active area AA2' may be disposed on respective sides of the first sub-active area AA1' in the second direction D2, and the third sub-active area AA3' may be disposed between respective edges of the second sub-active area AA2' and the active area AA in the second direction D2.

In an embodiment, the first sub-active area AA1', the second sub-active area AA2', and the third sub-active area AA3' are shown to have different areas; however, the first sub-active area AA1', the second sub-active area AA2', and the third sub-active area AA3' may have the same area.

The first touch electrode 320 and the second touch electrode 330 described with reference to FIG. 2 or FIG. 5 may be disposed in the first sub-active area AA1', the first touch electrode 320 and the second touch electrode 330 described with reference to FIG. 3 or FIG. 6 may be disposed in the second sub-active area AA2', and the first touch electrode 320 and the second touch electrode 330 described with reference to FIG. 4 or FIG. 7 may be disposed in the third sub-active area AA3'.

Accordingly, capacitance between the first touch electrode 320 and the second touch electrode 330 disposed in the second sub-active area AA2' becomes greater than capacitance between the first touch electrode 320 and the second touch electrode 330 disposed in the first sub-active area AA1'. Capacitance between the first touch electrode 320 and the second touch electrode 330 disposed in the third sub-active area AA3' becomes greater than capacitance between the first touch electrode 320 and the second touch electrode 330 disposed in the second sub-active area AA2'. As the encapsulation layer 210 becomes thinner toward the respective edges of the active area AA, the deteriorated touch sensing signal may be compensated, and uniformity of the touch sensing signal of the first to third sub-active areas AA1', AA2', and AA3' may be improved.

In an embodiment, the active area AA is shown to be divided into three sub-active areas AA1', AA2', and AA3'; however, the number and size of the sub-active areas included in the active area AA are not limited. That is, the active area AA may be divided into a plurality of sub-active areas such that the border portion between the first touch electrode 320 and the second touch electrode 330 may become gradually longer toward the respective sides of the active area AA from the center of the active area AA.

Except for the above-noted difference, characteristics of an exemplary embodiment described with reference to FIG. 1 to FIG. 11 may be applied to an exemplary embodiment described with reference to FIG. 12, and repeated descriptions between exemplary embodiments will not be provided.

Figure 13:
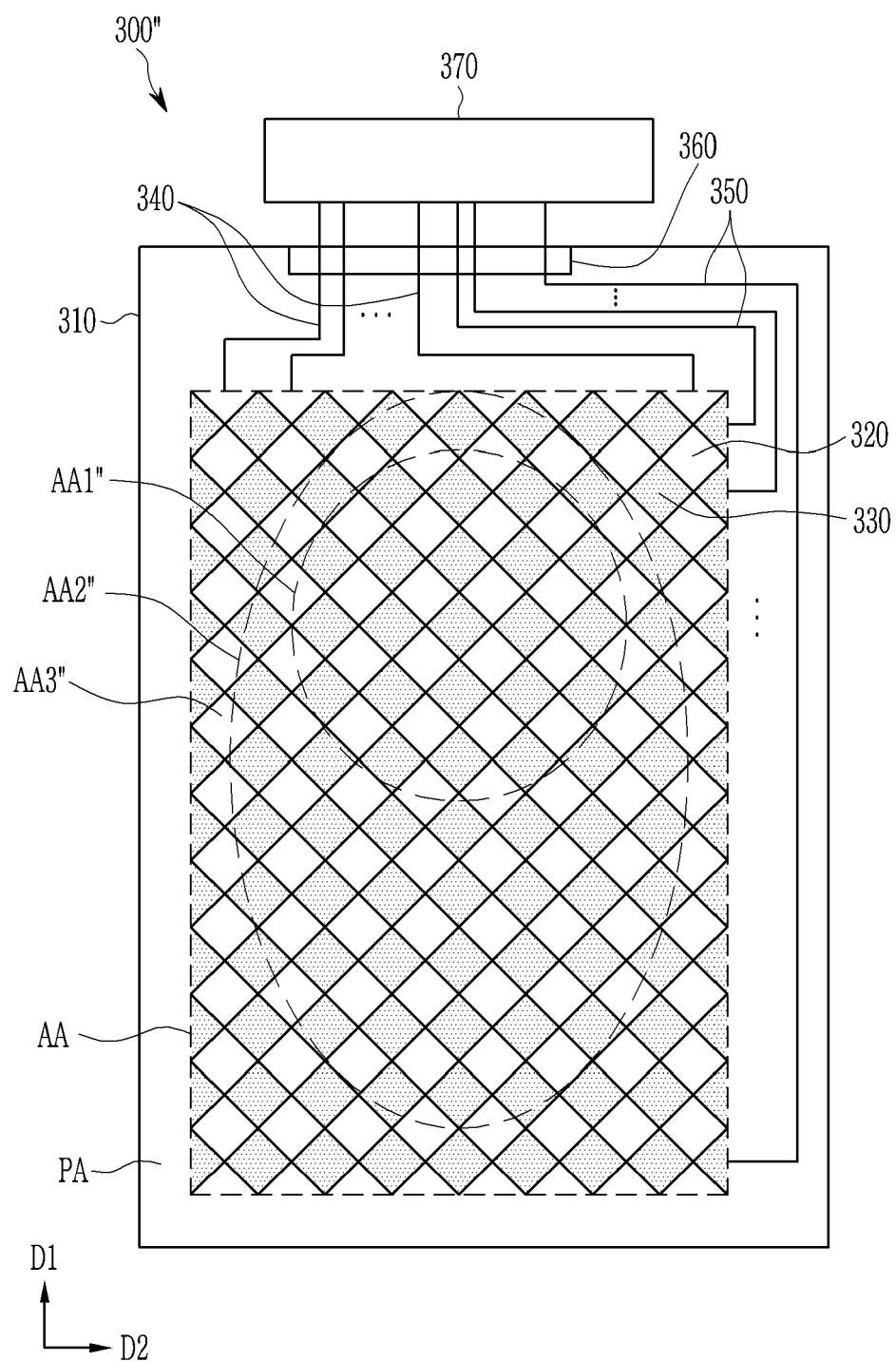
FIG. 13 shows a touch sensor according to another exemplary embodiment of the present invention.

FIG. 13 shows a touch sensor 300" according to another exemplary embodiment of the present invention.

Referring to FIG. 13, the active area AA includes a first sub-active area AA1", a second sub-active area AA2", and a third sub-active area AA3". The first sub-active area AA1" may be disposed somewhat nearer to the pad portion 360 with respect to the center of the active area AA. The second sub-active area AA2" may be disposed on a side area surrounding the first sub-active area AA1". The third sub-active area AA3" may be disposed in an edge area of the active area AA excluding the first sub-active area AA1" and the second sub-active area AA2" from the active area AA.

The first touch electrode 320 and the second touch electrode 330 described with reference to FIG. 2 or FIG. 5 may be disposed in the first sub-active area AA1", the first touch electrode 320 and the second touch electrode 330 described with reference to FIG. 3 or FIG. 6 may be disposed in the second sub-active area AA2", and the first touch electrode 320 and the second touch electrode 330 described with reference to FIG. 4 or FIG. 7 may be disposed in the third sub-active area AA3".

Therefore, capacitance between the first touch electrode 320 and the second touch electrode 330 disposed in the second sub-active area AA2" becomes greater than capacitance between the first touch electrode 320 and the second touch electrode 330 disposed in the first sub-active area AA1". Capacitance between the first touch electrode 320 and the second touch electrode 330 disposed in the third sub-active area AA3" becomes greater than capacitance between the first touch electrode 320 and the second touch electrode 330 disposed in the second sub-active area AA2". The touch sensing signal that is deteriorated as it becomes more distant from the pad portion 360 and that is deteriorated as the encapsulation layer 210 becomes thinner when it goes to the respective edges of the active area AA may be compensated, and uniformity of the touch sensing signal of the first to third sub-active areas AA1", AA2", and AA3" may be improved.

In an embodiment, the active area AA is exemplified to be divided into three sub-active areas AA1", AA2", and AA3"; however, the number and size of the sub-active areas included in the active area AA are not limited. That is, the active area AA may be divided into a plurality of sub-active areas such that the border portion between the first touch electrode 320 and the second touch electrode 330 may become gradually longer as it goes to the edge of the active area AA from the center of the active area AA.

Except for the above-noted difference, characteristics of an exemplary embodiment described with reference to FIG. 1 to FIG. 11 may be applied to an exemplary embodiment described with reference to FIG. 13, and repeated descriptions between exemplary embodiments will not be provided.

The accompanying drawings and description of some exemplary embodiments of the present invention are provided as only examples of the present invention, and are used to describe the present invention but do not limit the scope of the present invention as set forth in the claims.

Thus, it is to be understood by those of ordinary skill in the art that various modifications and equivalent embodiments may be made.

What is claimed is:

1. A touch sensor comprising:
   an active area including a first sub-active area and a second sub-active area;
   a plurality of first touch electrodes in the first sub-active area and the second sub-active area, each of the first touch electrodes including a first body portion having a rhombus shape;
   a plurality of second touch electrodes in the first sub-active area and the second sub-active area, each of the second touch electrodes including a second body portion having the rhombus shape; and
   a pad portion electrically connected to the first touch electrodes and the second touch electrodes,
   wherein at least one of the first touch electrodes includes at least one first protrusion protruded from the first body portion in a direction crossing a side of the rhombus shape, and at least one of the second touch electrodes includes at least one second protrusion protruded from the second body portion in a direction crossing a side of the rhombus shape and arranged to interlock with the at least one first protrusion, and
   a number or a size of the at least one first protrusion and a number or a size of the at least one second protrusion are increased so as to increase a capacitance between the at least one first protrusion and the at least one second protrusion as far from the pad portion.

2. The touch sensor of claim 1, wherein a length of a first border portion that is a separated area between adjacent first and second touch electrodes in the first sub-active area is different from a length of a second border portion that is a separated area between adjacent first and second touch electrodes in the second sub-active area, and
   the second sub-active area is at an end of the active area distal from an outer side at which the pad portion is located, and the length of the second border portion is longer than the length of the first border portion.

3. The touch sensor of claim 2, wherein a number of the at least one first protrusion of the first touch electrode in the second sub-active area is greater than a number of the at least one first protrusion of the first touch electrode in the first sub-active area.

4. The touch sensor of claim 3, wherein a number of the at least one second protrusion of the second touch electrode in the second sub-active area is greater than a number of the at least one second protrusion of the second touch electrode in the first sub-active area.

5. The touch sensor of claim 4, wherein the first sub-active area is nearer to the pad portion than the second sub-active area is.

6. The touch sensor of claim 4, wherein
   the first sub-active area is in a center between respective edges of the active area, the second sub-active area is on respective sides of the first sub-active area.

7. The touch sensor of claim 4, wherein
   the first sub-active area is in a center of the active area, the second sub-active area is on a side area surrounding the first sub-active area.

8. The touch sensor of claim 2, wherein the at least one first protrusion of the first touch electrode in the second sub-active area is larger than the at least one first protrusion of the first touch electrode in the first sub-active area.

9. The touch sensor of claim 8, wherein the at least one second protrusion of the second touch electrode in the second sub-active area is larger than the at least one second protrusion of the second touch electrode in the first sub-active area.

10. The touch sensor of claim 9, wherein the first sub-active area is nearer to the pad portion than the second sub-active area is.

11. The touch sensor of claim 9, wherein
the first sub-active area is in a center between respective edges of the active area, the second sub-active area is on respective sides of the first sub-active area.

12. The touch sensor of claim 9, wherein
the first sub-active area is in a center of the active area, the second sub-active area is on a side area surrounding the first sub-active area.

13. A display device comprising:
a substrate;
a transistor on the substrate;
a light-emitting device on the transistor;
an encapsulation layer on the light-emitting device;
a plurality of first touch electrodes and a plurality of second touch electrodes on the encapsulation layer, each of the first touch electrodes including a first body portion having a rhombus shape, and each of the second touch electrodes including a second body portion having the rhombus shape; and
a pad portion electrically connected to the first touch electrodes and the second touch electrodes,
wherein at least one of the first touch electrodes includes at least one first protrusion protruded from the first body portion in a direction crossing a side of the rhombus shape, and at least one of the second touch electrodes includes at least one second protrusion protruded from the second body portion in a direction crossing a side of the rhombus shape and arranged to interlock with the at least one first protrusion, and
a number or a size of the at least one first protrusion and a number or a size of the at least one second protrusion are increased so as to increase a capacitance between the at least one first protrusion and the at least one second protrusion as far from the pad portion.

14. The display device of claim 13, wherein
a length of a first border portion that is a separated area between adjacent first and second touch electrodes in a first sub-active area of an active area and a length of a second border portion that is a separated area between adjacent first and second touch electrodes in a second sub-active area of the active area are determined by the number of the at least one first protrusion and the number of the at least one second protrusion.

15. The display device of claim 14, wherein
a number of the at least one first protrusion of the first touch electrode in the second sub-active area is greater than a number of the at least one first protrusion of the first touch electrode in the first sub-active area, and
a number of the at least one second protrusion of the second touch electrode in the second sub-active area is greater than a number of the at least one second protrusion of the second touch electrode in the first sub-active area.

16. The display device of claim 15, wherein the first sub-active area is nearer to the pad portion than the second sub-active area is.

17. The display device of claim 15, wherein
the first sub-active area is in a center between respective edges of the active area, the second sub-active area is on respective sides of the first sub-active area.

18. The display device of claim 15, wherein
the first sub-active area is in a center of the active area, the second sub-active area is on a side area surrounding the first sub-active area.

19. The display device of claim 13, wherein
a length of a first border portion that is a separated area between adjacent first and second touch electrodes in a first sub-active area of an active area and a length of a second border portion that is a separated area between adjacent first and second touch electrodes in a second sub-active area of the active area are determined by the size of the at least one first protrusion and the size of the at least one second protrusion.

20. The display device of claim 19, wherein
the at least one first protrusion of the first touch electrode in the second sub-active area is larger than the at least one first protrusion of the first touch electrode in the first sub-active area, and
the at least one second protrusion of the second touch electrode in the second sub-active area is larger than the at least one second protrusion of the second touch electrode in the first sub-active area.

* * * * *